United States Patent [19]

Arii et al.

[11] Patent Number: 4,932,760

[45] Date of Patent: Jun. 12, 1990

[54] MAGNETO-OPTIC GARNET

[75] Inventors: Mitsuzo Arii; Norio Takeda; Yasunori Tagami; Kazushi Shirai, all of Tokyo, Japan

[73] Assignee: Mitsubishi Gas Chemical Company, Inc., Tokyo, Japan

[21] Appl. No.: 314,927

[22] Filed: Feb. 24, 1989

[30] Foreign Application Priority Data

Feb. 26, 1988 [JP] Japan .................................. 63-41979

[51] Int. Cl.[5] .................................................. G02F 1/09

[52] U.S. Cl. .................................... 350/375; 350/376; 428/611; 428/668; 428/681

[58] Field of Search ............... 350/355, 375, 376, 377, 350/378; 428/611, 668, 681, 694, 900, 928

[56] References Cited

U.S. PATENT DOCUMENTS 4,810,065 3/1989 Valette et al. .................. 350/375 X

FOREIGN PATENT DOCUMENTS 0123814 6/1986 Japan .................................. 350/375

*Primary Examiner*—Eugene R. LaRoche

*Assistant Examiner*—Nathan W. McCutcheon

*Attorney, Agent, or Firm*—Wenderoth, Lind & Ponack

[57] ABSTRACT

This invention provides a magneto-optic garnet grown by liquid phase epitaxy on a nonmagnetic garnet substrate and having a composition of the following formula (1)

$$Ho_xTb_yBi_{3-x-y}Fe_5O_{12} \quad (1)$$

wherein $0.3 \leqq y/x \leqq 1.0$ and $x+y<3.0$.

According to this invention there is provided a magneto-optic garnet as a Faraday rotator for use in an optical isolator, optical circulator, etc., utilizing Faraday effect, which has a very large Faraday rotation coefficient, a small difference in lattice constant from a nonmagnetic garnet substrate, exhibits a mirror face without causing a film defect (or so-called pit), and has a small temperature dependency.

5 Claims, No Drawings

MAGNETO-OPTIC GARNET

FIELD OF THE INVENTION

This invention relates to a magneto-optic garnet for optical elements for use in optical isolators, circulators, etc., using Faraday effect.

DESCRIPTION OF THE PRIOR ARTS

Laser diodes are widely used as a coherent light source for light-applied apparatus and optical communication. However, there is a problem that when beams emitted from a laser diode are then reflected by an optical system, reflected beams make laser diode oscillation unstable.

In order to overcome the above problem, an attempt has been under way to provide a light path to prevent beams emitted from a laser diode from returning thereto by providing an optical isolator on the optical emission side of the laser diode.

As a Faraday rotator for an optical isolator to separate beams emitted from a laser diode and reflected beams by utilizing Faraday effect, there have been used bulk single crystals of yttrium iron garnet (YIG) having excellent transparency in the wavelength of not less than 1.1 μm. Further, there have recently been many reports on bismuth-substituted rare-earth iron garnet thick films, which are single crystal thick films grown by liquid phase epitaxy, having a Faraday rotation coefficient several times larger than that of YIG and obtained by mass-producible liquid phase epitaxy (LPE). Since the Faraday rotation coefficient of a bismuth-substituted rare-earth iron garnet increases nearly in proportion to the increase of the amount of substituted bismuth, it is desired to form a garnet film containing as much as possible an amount of bismuth.

Since, however, bismuth has a large ionic radius, the lattice constant of the bismuth-substituted rare-earth iron garnet increases in proportion to the increase of the amount of substituted bismuth, and therefore, a limitation is imposed on the amount of bismuth for the substitution in order to achieve its lattice conformity to those used as a substrate in such a thick film such as a neodymium gadolium gallium garnet ($Nd_3Fe_5O_{12}$) substrate (to be referred to as "NGG substrate" hereinbelow) having a lattice constant of 12.509 Å and a calcium-magnesium-zirconium-substituted gadolinium gallium garnet $\{(GdCa)_3(GaMgZr)_5O_{12}\}$ substrate (to be referred to as "SGG substrate" hereinbelow) having a lattice constant of about 12.496Å–12.530 Å.

In order to avoid the above limitation and use as much as possible an amount of bismuth for the substitution, a rare-earth element having a smaller ionic radius is used, and as a result, such use can prevent the increase in the lattice constant.

An example of the use of rare earth element ions having a small ionic radius from the above viewpoint is reportedly $(LuBi)_3Fe_5O_{12}$ in which a large amount of bismuth is substituted for Lu [e.g., see 32th Applied Physics-Related Associated Lectures, 30p-N-5 (1985)]. However, the use of such a material causes a film defect called "pit", and it is difficult to obtain a mirror face. Thus, such a material has not yet been put to practical use.

Further, "Japan Applied Magnetism Society Report" Vol. 10, No. 2 (1986), pages 143 to 146, proposes an addition of $Gd^{3+}$ ions in order to improve the above problem that the film defect takes place in $(LuBi)_3Fe_5O_{12}$, and it is also reported therein that, as a result, a thick film of $(GdLuBi)_3Fe_5O_{12}$ having a Faraday rotation coefficient, at a wavelength of 1.3 μm, of as large as 1,800 deg/cm and exhibiting a mirror face was obtained.

In general, however, the Faraday effect of Bi-substituted rare-earth iron garnet is affected by temperature, and thereby a temperature change brings a change of Faraday rotation angle which leads directly to degradation of performance. Therefore, it is desired that temperature dependency should be as small as possible. Especially, however, it is described in, for example, a treatise entitled "Improvement of Temperature Characteristic Of Bi-Substituted Garnet In Falady Rotation Angle by Dy" of "Japan Applied Magnetism Society Report", Vol. 10, No. 2 (1986), pages 151 to 154, that the temperature dependency in the use of $Gd^{3+}$ ions increases more than that in the use of the other rare-earth elements.

In view of the temperature dependency, therefore, it cannot be said that such use of $Gd^{3+}$ ions as a main component of bismuth-substituted rare-earth iron garnet as in the above $(GdLuBi)_3Fe_5O_{12}$ is preferable.

SUMMARY OF THE INVENTION

It is an object of this invention to provide a magneto-optic garnet as a Faraday rotator for use in an optical isolator, optical Circulator, etc., utilizing Faraday effect.

It is another object of this invention to provide a magneto-optic garnet as a Faraday rotator, which has a very large Faraday rotation coefficient.

It is another object of this invention to provide a magneto-optic garnet as a Faraday rotator, which is prepared by forming a garnet film having a very large Faraday rotation coefficient and a small difference in lattice constant from a nonmagnetic garnet substrate.

It is further another object of this invention to provide a magneto-optic garnet as a Faraday rotator, which is prepared by forming a garnet film having a very large Faraday rotation coefficient and exhibiting a mirror face without causing a film defect (or so-called pit).

It is yet another object of this invention to provide a magneto-optic garnet as a Faraday rotator, which is prepared by forming a garnet film having a very large Faraday rotation coefficient and a small temperature dependency.

According to this invention there is provided a magneto-optic garnet grown by liquid phase epitaxy on a nonmagnetic garnet substrate and having a composition of the following formula (1)

$$Ho_xTb_yBi_{3-x-y}Fe_5O_{12} \quad (1)$$

wherein $0.3 \leqq y/x \leqq 1.0$ and $x+y<3.0$.

DETAILED DESCRIPTION OF THE INVENTION

In this invention, y/x in the formula (1), i.e., the component ratio of Tb to Ho in the single crystal film is 0.3 to 1.0, preferably 0.5 to 1.0. If the above y/x is less than the above lower limit, more than 100, per 1 $cm^2$, of so-called pits occur, i.e., the crystal failure occurs, and the resultant magneto-optic garnet is not suitable for use as a Faraday rotator. And if the above y/x exceeds the above upper limit, the lattice constant of the single crystal film increases since the Tb ionic radius is large. Consequently, for this reason, there is no option but to reduce 3-x-y in the formula (1), i.e., the amount of substituted Bi, in order to bring the conformity with the lattice constant of a nonmagnetic garnet substrate. If the amount of Bi for the substitution is reduced, the Faraday rotation coefficient decreases, and the film thickness need be larger in order to obtain a necessary Faraday rotation angle. Thus, there is caused a disadvantage in industrial production.

The amount of Bi for the substitution may be suitably selected depending upon the lattice constant of a nonmagnetic garnet substrate. However, in the case of presently commercially available nonmagnetic garnet substrates having a lattice constant of from 12.496 to 12.530 Å, the amount of Bi for the substitution (i.e., 3-x-y) is preferably 0.9 to 1.7.

The single crystal film of this invention having a composition of the formula $$Ho_xTb_yBi_{3-x-y}Fe_5O_{12} \quad (1)$$

wherein $0.3 \leqq y/x \leqq 1.0$ and $x+y<3.0$. can be obtained by growing same on a nonmagnetic garnet substrate according to liquid phase epitaxy.

The liquid phase epitaxy is carried out, in general, in the following manner.

While a melt in a platinum crucible (solution of flux component and garnet material component) is maintained at a supersaturation temperature (usually 750° to 850° C.), a nonmagnetic garnet substrate is immersed in the melt or contacted to the surface of the melt. Then, magnetic garnet grows as a single crystal film on the substrate.

Usually used as the flux component is a mixture of PbO, $B_2O_3$ and $Bi_2O_3$. The substrate is, for example, neodymium gallium garnet, $Nd_3Ga_5O_{12}$(NGG), having a lattice constant of 12.509 Å or calcium-magnesium-zirconium-substituted gadolinium gallium garnet, $(CaGd)_3(MgZrGa)_5O_{12}$(SGGG), having a lattice constant of from 12.496 to 12.530 Å. These substrates are suitably usable for the growth of bismuth-substituted magnetic garnet owing to their large lattice constants.

When a magneto-optic garnet is actually used in a Faraday rotator for an optical isolator, the film face is, in general, polished to adjust the film thickness such that the rotation angle in plane of polarization exhibits 45°±1°. In this case, it is not always necessary to remove the substrate completely by polishing. Since, however, Fresnel reflection (about 1%) occurs in the interface between the substrate and the film, it is desirable to remove the substrate if the reflected light causes a problem.

By compensating for the large ionic radius of Bi by the small ionic radius of the Ho-Tb two component system, this invention makes it possible to obtain a single crystal film of magneto-optic garnet having, as a Faraday rotator, specially excellent properties that its lattice constant is nearly equal to the lattice constant of a nonmagnetic garnet substrate and that not only the Faraday rotation coefficient of the magneto-optic garnet is large but also its temperature dependency is small.

EXAMPLES

This invention will be illustrated more in detail in the following Examples, in which the Faraday rotation coefficients and Faraday rotation angles were measured as follows.

Method of measuring Faraday rotation coefficient:

Polarized light was directed to a garnet film and a rotation angle of a polarized light plane was measured by rotating an analyzer. At this time, the garnet film was magnetically saturated by an external magnetic field to arrange the magnetism of the garnet in the direction of the external magnetic field. The rotation angle measured as mentioned above is a Faraday rotation angle ($\theta$), and the value obtained by dividing the Faraday rotation angle by the thickness of a garnet film is a Faraday rotation coefficient ($\theta_F$).

Method of measuring temperature dependency of Faraday rotation angle:

A garnet film was heated or cooled, and Faraday rotation angles were measured at temperatures after the heating or cooling.

EXAMPLE 1

A (111) NGG substrate (having a lattice constant of 12.509 Å) was contacted to the surface of a melt having a composition shown in the following Table 1, and a film was grown on one surface of the substrate at 820° for 15 hours by liquid phase epitaxy to give a magnetic garnet single crystal film exhibiting a mirror face and having a thickness of 250 μm and a composition of $Ho_{1.11}Tb_{0.56}Bi_{1.33}Fe_5O_{12}$. The above composition of the garnet was determined by dissolving the film, from which the substrate had been removed, in hot phosphoric acid and subjecting its solution to plasma emission analysis.

The resultant single crystal film had a Faraday rotation coefficient, at a wavelength of 1.3 μm, of 0.22 deg/μm and a Faraday rotation coefficient change ratio, per 1° C. at a temperature of from −20° to 70° C., of 0.113%. Thus, the single crystal film had excellent properties as a Faraday rotator.

TABLE 1

| Component | Mole % |
|---|---|
| PbO | 50.0 |
| $Bi_2O_3$ | 30.0 |
| $B_2O_3$ | 10.5 |
| $Fe_2O_3$ | 9.10 |
| $Ho_2O_3$ | 0.33 |
| $Tb_4O_7$ | 0.07 |

EXAMPLE 2

A (111) NGG substrate was contacted to the surface of a melt having a composition shown in the following Table 2 and a film was grown on one surface of the substrate at 817° C. for 15 hours by liquid phase epitaxy to give a magnetic garnet single crystal film exhibiting a mirror face and having a thickness of 245 μm and a composition of $Ho_{1.03}Tb_{0.95}Bi_{1.02}Fe_5O_{12}$.

The above single crystal film had a Faraday rotation coefficient, at a wavelength of 1.3 μm, of 0.17 deg/μm and a Faraday rotation coefficient change ratio, per 1° C. at a temperature of from −20° to 70° C., of 0.010%. Thus, the single crystal film had excellent properties as a Faraday rotator.

TABLE 2

| Component | Mole % |
|---|---|
| PbO | 50.0 |
| $Bi_2O_3$ | 30.0 |
| $B_2O_3$ | 10.5 |
| $Fe_2O_3$ | 9.10 |
| $Ho_2O_3$ | 0.27 |

TABLE 2-continued

| Component | Mole % |
|---|---|
| $Tb_4O_7$ | 0.13 |

EXAMPLE 3

A (111) SGGG substrate (having a lattice constant of 12.497 Å) was contacted to the surface of a melt having a composition shown in the following Table 3 and a film was grown on one surface of the substrate at 825° C. for 15 hours by liquid phase epitaxy to give a magnetic garnet single crystal film exhibiting a mirror face and having a thickness of 236 μm and a composition of $Ho_{1.22}Tb_{0.62}Bi_{1.16}Fe_5O_{12}$.

The above single crystal film had a Faraday rotation coefficient, at a wavelength of 1.3 μm, of 0.20 deg/μm and a Faraday rotation coefficient change ratio, per 1° C. at a temperature of from −20° to 70° C., of 0.106%. Thus, the single crystal film had excellent properties as a Faraday rotator.

TABLE 3

| Component | Mole % |
|---|---|
| PbO | 52.0 |
| $Bi_2O_3$ | 26.0 |
| $B_2O_3$ | 10.5 |
| $Fe_2O_3$ | 11.1 |
| $Ho_2O_3$ | 0.32 |
| $Tb_4O_7$ | 0.08 |

COMPARATIVE EXAMPLE 1

A (111) SGGG substrate (having a lattice constant of 12.497 Å) was contacted to the surface of a melt having a composition shown in the following Table 4 and a film was grown on one surface of the substrate at 823° C. for 24 hours by liquid phase epitaxy to give a magnetic garnet single crystal film having a thickness of 318 μm and a composition of $Ho_{1.35}Tb_{0.40}Bi_{1.25}Fe_5O_{12}$.

However, the above single crystal film had many pits on its surface and was not suitable as a Faraday rotator.

TABLE 4

| Component | Mole % |
|---|---|
| PbO | 52.0 |
| $Bi_2O_3$ | 26.0 |
| $B_2O_3$ | 10.5 |
| $Fe_2O_3$ | 11.1 |
| $Ho_2O_3$ | 0.36 |
| $Tb_4O_7$ | 0.04 |

What is claimed is:

1. A magneto-optic garnet grown by liquid phase epitaxy on a nonmagnetic garnet substrate and having a composition of the following formula (1)

$$Ho_xTb_yBi_{3-x-y}Fe_5O_{12} \quad (1)$$

wherein $0.3 \leqq y/x \leqq 1.0$ and $x+y<3.0$.

2. A magneto-optic garnet according to claim 1 wherein the "y/x" in the formula (1) is $0.5 \leqq y/x \leqq 1.0$.

3. A magneto-optic garnet according to claim 1 wherein the "3-x-y" in the formula (1) is $0.9 \leqq 3-x-y \leqq 1.7$.

4. A magneto-optic garnet according to claim 1 wherein the nonmagnetic garnet substrate is a calcium-magnesium-zirconium-substituted gadolinium gallium garnet substrate.

5. A magneto-optic garnet according to claim 1 wherein the nonmagnetic garnet substrate is a neodymium gallium garnet substrate.

* * * * *

US004932760B1

REEXAMINATION CERTIFICATE (1815th)

United States Patent [19]

[11] B1 4,932,760

Arii et al.

[45] Certificate Issued Oct. 20, 1992

[54] MAGNETO-OPTIC GARNET

[75] Inventors: Mitsuzo Arii; Norio Takeda; Yasunori Tagami; Kazushi Shirai, all of Tokyo, Japan

[73] Assignee: Mitsubishi Gas Chemical Company, Inc., Tokyo, Japan

Reexamination Request:
No. 90/002,679, Mar. 23, 1992

Reexamination Certificate for:

| | |
|---|---|
| Patent No.: | **4,932,760** |
| Issued: | **Jun. 12, 1990** |
| Appl. No.: | **314,927** |
| Filed: | **Feb. 24, 1989** |

[30] Foreign Application Priority Data

Feb. 26, 1988 [JP] Japan .................................. 63-41979

[51] Int. Cl.[5] ........................... G02F 1/09; G02F 1/00

[52] U.S. Cl. .................................... 359/280; 359/281; 359/324; 428/611; 428/668; 428/681

[58] Field of Search ................ 359/280, 281, 321, 324

[56] References Cited

FOREIGN PATENT DOCUMENTS 0086387 8/1983 European Pat. Off. .

OTHER PUBLICATIONS

Soviet Physics JETP, vol. 30, No. 2, Feb. 1970, pp. 198-201; G. S. Krinchik et al.; "Effect of Magnetic field on the faraday effect in erbium, terbiu, and holium iron garnets".

*Primary Examiner*—Bruce Y. Arnold

[57] ABSTRACT

This invention provides a magneto-optic garnet grown by liquid phase epitaxy on a nonmagnetic garnet substrate and having a composition of the following formula (1)

$$Ho_xTb_yBi_{3-x-y}Fe_5O_{12} \quad (1)$$

wherein $0.3 \leqq y/x \leqq 1.0$ and $x+y<3.0$.

According to this invention there is provided a magneto-optic garnet as a Faraday rotator for use in an optical isolator, optical circulator, etc., utilizing Faraday effect, which has a very large Faraday rotation coefficient, a small difference in lattice constant from a nonmagnetic garnet substrate, exhibits a mirror face without causing a film defect (or so-called pit), and has a small temperature dependency.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-5 is confirmed.

* * * * *